United States Patent
Mu

(10) Patent No.: US 12,284,133 B2
(45) Date of Patent: Apr. 22, 2025

(54) INFORMATION PROCESSING METHOD AND RELATED DEVICE

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 400 days.

(21) Appl. No.: 17/764,532

(22) PCT Filed: Sep. 30, 2019

(86) PCT No.: PCT/CN2019/109612
§ 371 (c)(1),
(2) Date: Mar. 28, 2022

(87) PCT Pub. No.: WO2021/062712
PCT Pub. Date: Apr. 8, 2021

(65) Prior Publication Data
US 2022/0345279 A1   Oct. 27, 2022

(51) Int. Cl.
*H04L 5/00* (2006.01)
*H04L 1/1607* (2023.01)
*H04L 1/1812* (2023.01)

(52) U.S. Cl.
CPC .......... *H04L 5/0055* (2013.01); *H04L 1/1607* (2013.01); *H04L 1/1812* (2013.01); *H04L 5/0048* (2013.01); *H04L 5/0057* (2013.01)

(58) Field of Classification Search
CPC ... H04L 5/0048; H04L 5/0053; H04L 5/0055; H04L 5/0057; H04L 1/1607; H04L 1/18; H04L 1/1812; H04L 1/1816
See application file for complete search history.

(56) References Cited

U.S. PATENT DOCUMENTS

| | | | |
|---|---|---|---|
| 10,880,895 B2* | 12/2020 | Gordaychik | ........ H04W 72/044 |
| 2014/0056278 A1* | 2/2014 | Marinier | ............. H04W 72/044 370/330 |

(Continued)

FOREIGN PATENT DOCUMENTS

| | | |
|---|---|---|
| CN | 106301670 A | 1/2017 |
| CN | 108347789 A | 7/2018 |

(Continued)

OTHER PUBLICATIONS

International Search Report of PCT Application No. PCT/CN2019/109612 dated Jun. 23, 2020 with English translation, (4p).
OA for JP Application No. 2022-519404 dated Sep. 7, 2023, with English translation, (8p).
Nokia, "Preconfigured Grant for Uplink transmission", 3GPP TSG RAN WG1 Meeting #94, R1-1811074, Gothenburg, Sweden, Aug. 20-24, 2018, (7p).

(Continued)

*Primary Examiner* — Kevin D Mew
(74) *Attorney, Agent, or Firm* — Arch & Lake LLP; Hao Tan; Shen Wang

(57) ABSTRACT

A method for processing information is provided. The method includes that a base station transmits downlink control information (DCI) to a terminal. The DCI includes a first indication field. The first indication filed is configured to carry response information of hybrid automatic repeat request (HARQ). The DCI further includes a second indication field configured to carry a trigger notification of random access or early data transmission (EDT). Furthermore, the terminal determines the response information of the HARQ based on the first indication field in the DCI, and determines the trigger notification of random access or EDT based on a second indication field when the DCI includes the second indication field.

16 Claims, 9 Drawing Sheets

(56) References Cited

U.S. PATENT DOCUMENTS

| | | | |
|---|---|---|---|
| 2014/0328329 A1 | 11/2014 | Novlan et al. | |
| 2015/0071198 A1* | 3/2015 | Deng | H04W 74/006 |
| | | | 370/329 |
| 2015/0146674 A1* | 5/2015 | Krishnamurthy | H04W 72/23 |
| | | | 370/329 |
| 2017/0279583 A1* | 9/2017 | Dinan | H04W 72/23 |
| 2018/0145796 A1 | 5/2018 | Liang et al. | |
| 2018/0270801 A1 | 9/2018 | Novlan et al. | |
| 2019/0097762 A1 | 3/2019 | Jeon et al. | |
| 2019/0141546 A1* | 5/2019 | Zhou | H04L 5/001 |
| 2019/0223197 A1* | 7/2019 | Shin | H04L 1/0031 |
| 2019/0246254 A1* | 8/2019 | Chatterjee | H04W 76/11 |
| 2019/0253231 A1* | 8/2019 | Park | H04L 5/1469 |
| 2019/0254013 A1* | 8/2019 | Chang | H04L 5/00 |
| 2019/0254082 A1 | 8/2019 | Takeda et al. | |
| 2019/0260518 A1 | 8/2019 | Tang et al. | |
| 2021/0014011 A1* | 1/2021 | Xiong | H04L 1/1887 |

FOREIGN PATENT DOCUMENTS

| | | | | |
|---|---|---|---|---|
| CN | 109586878 A | 4/2019 | | |
| CN | 110012557 A | 7/2019 | | |
| CN | 110169119 A | 8/2019 | | |
| CN | 110177358 A | 8/2019 | | |
| EP | 3282632 A1 * | 2/2018 | | H04B 7/0623 |
| EP | 3562251 A1 * | 10/2019 | | H04L 47/6275 |
| EP | 3846568 A1 * | 7/2021 | | H04L 1/08 |
| WO | WO-2011132721 A1 * | 10/2011 | | H04L 1/0026 |
| WO | WO-2014110764 A1 * | 7/2014 | | H04B 7/2612 |
| WO | 2018064367 A1 | 4/2018 | | |
| WO | 2019031427 A1 | 2/2019 | | |

OTHER PUBLICATIONS

Nokia, "Preconfigured Grant for Uplink transmission", 3GPP TSG RAN WG1, R1-1808440, Meeting #94 Gothenburg, Sweden, Aug. 20-24, 2018, (5p).

Nokia, "Transmission in preconfigured UL resources" 3GPP TSG RAN WG1 Meeting #94, R1-1808431, Gothenburg, Sweden, Aug. 20-24, 2018, 5 pages.

JPOA of Application 2022-519404, dated on May 9, 2023, with English translation, (6p).

The Extended European Search Report for EP application 19948017.9, dated on May 24, 2023, (17p).

Samsung, "Discussion on transmission in preconfigured UL resources for NB-IOT" 3GPP TSG-RAN WG1 Meeting #95, R1-1812947, Spokane, USA, Nov. 12-16, 2018, (7p).

LG Electronics, "Discussion on preconfigured UL resources in NB-IOT" 3GPP TSG-RAN WG1 #98, R1-1908529, Prague, CZ, Aug. 26-30, 2019, (7p).

ZTE, "Support for transmission in preconfigured UL resources for NB-IOT" 3GPP TSG-RAN WG1 Meeting #95, R1-1812774, Spokane, USA, Nov. 12-16, 2018, (7p).

OA for KR application 10-2022-7013623 dated May 22, 2024 with English translation, (10p).

Huawei, HiSilicon: "Transmission in preconfigured UL resources," 3GPP TSG WG1, Meeting#98, R1-1908087, Prague, Czech Republic, Aug. 26-30, 2019, (15p).

Huawei, HiSilicon: "UL transmission in preconfigured resource," 3GPP TSG WG1, Meeting#98, R1-1908081, Prague, Czech Republic, Aug. 26-30, 2019, (9p).

ZTE: "Support for transmission in preconfigured UL resource for MTC," GPP TSG WG1, Meeting#98, R1-1908256, Prague, CZ, Aug. 26-30, 2019, (14p).

* cited by examiner

INFORMATION PROCESSING METHOD AND RELATED DEVICE

CROSS-REFERENCE TO RELATED APPLICATION

This application is the U.S. national phase application of International Application No. PCT/CN2019/109612, filed on Sep. 30, 2019, the content of which is hereby incorporated by reference in its entirety for all purposes.

TECHNICAL FIELD

The disclosure relates to, but is not limited to, a field of wireless communication technologies, and particularly to a method and a device for processing information, communication devices and storage medium.

BACKGROUND

In recent years, the Internet of things (IoT) has developed vigorously, which has brought many conveniences to daily life and work. Machine type communication (MTC) and narrow band Internet of things (NB-IoT) are typical representatives of cellular IoT technology. At present, these technologies have been widely used in smart cities, such as meter reading, smart agriculture, such as collection of temperature and humidity information, smart transportation, such as bike sharing, and many other fields.

SUMMARY

In a first aspect of the present disclosure, a method for processing information is provided. The method includes that a base station transmits Downlink Control Information (DCI), where the DCI includes a first indication field configured to carry response information of Hybrid Automatic Repeat Request (HARQ); in response to determining that the DCI further includes a second indication field, the base station configures the second indication field to carry a trigger notification for performing random access or Early Data Transmission (EDT).

In a second aspect of the present disclosure, a method for processing information is provided. The method includes that: a terminal receives DCI; the terminal determines response information of HARQ indicated by the DCI based on a first indication field included in the DCI; in response to determining that the DCI includes a second indication field, the terminal determines a trigger notification for performing random access or EDT based on the second indication field.

In a third aspect of the present disclosure, a user equipment (UE) is provided. The UE includes a memory and a processor configured to implement the method for processing information according to the second aspect by executing computer executable instructions stored in the memory.

In a fourth aspect of the present disclosure, a base station is provided. The base station includes a memory and a processor configured to implement the method for processing information according to the first aspect by executing computer executable instructions stored in the memory.

It is to be understood that the above general description and the detailed description later are only exemplary and explanatory and do not limit the disclosure.

BRIEF DESCRIPTION OF THE DRAWINGS

The accompanying drawings, which are incorporated in and constitute a part of this specification, illustrate embodiments consistent with the disclosure, and together with the description serve to explain the principles of the disclosure.

DETAILED DESCRIPTION

Figure 1:
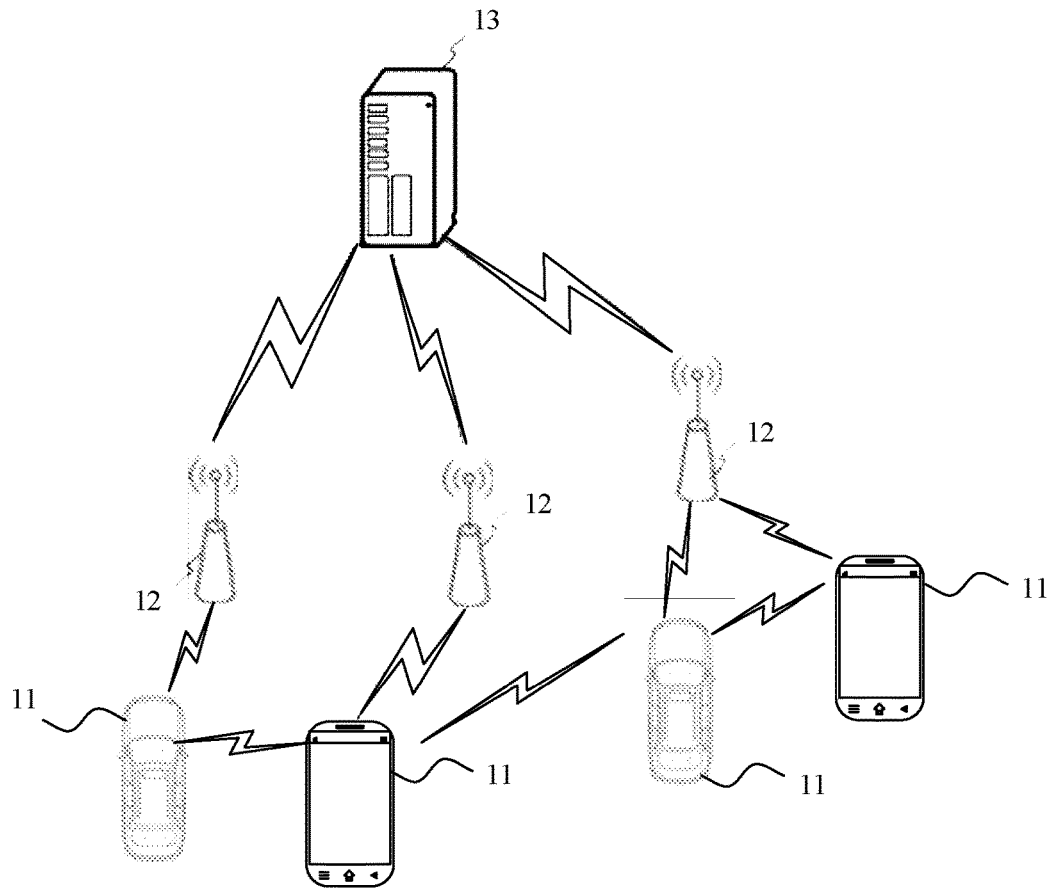
FIG. 1 is a schematic diagram illustrating a wireless communication system in accordance with an embodiment of the disclosure.

Here, embodiments will be described in detail, and examples thereof are shown in the drawings. When the following description relates to the drawings, unless otherwise indicated, the same numbers in different drawings represent the same or similar elements. The implementations described in the following embodiments do not represent all embodiments consistent with the embodiments of the disclosure. On the contrary, they are only examples of devices and methods consistent with some aspects of embodiments of the disclosure as detailed in the appended claims.

The terms used in embodiments of the disclosure are only for the purpose of describing specific embodiments and are not intended to limit embodiments of the disclosure. The singular forms "one", "said" and "this" used in embodiments of the disclosure and the appended claims are also intended to include most forms, unless the context clearly indicates other meanings. It should also be understood that the term "and/or" as used herein refers to and includes any or all possible combinations of one or more associated listed items.

It should be understood that although terms, such as first, second, third, etc. may be used to describe various information in embodiments of the disclosure, such information should not be limited to these terms. These terms are only used to distinguish the same type of information from each other. For example, without departing from the scope of the embodiments of the disclosure, the first information may also be referred to as the second information, and similarly, the second information may also be referred to as the first information. Depending on the context, the word "if" as used herein can be interpreted as "when" or "based on" or "in response to".

The Internet of things (IoT) equipment includes Machine type communication (MTC) equipment and narrow band Internet of things (NB-IoT) equipment. Since most of the MTC equipment and NB-IoT equipment are deployed in the basement, and due to the hardware limitations of the equipment, the coverage capacity is not as good as that of Long-Term Evolution (LTE) equipment based on cellular communication. Therefore, repeated transmission is adopted in the MTC equipment and NB-IoT equipment to accumulate power, to achieve coverage enhancement. In short, repeated transmission means that the same transmission content is transmitted in multiple time units. The above-mentioned time unit can be one subframe or multiple subframes.

In addition, since the MTC equipment is mostly deployed in scenes that are not easy to charge or replace batteries (such as in the field or basement), one of characteristics of the MTC equipment and the NB-IoT equipment is to save power.

In order to save power consumption, most MTC equipment and NB-IoT equipment is in the active state only to establish a connection and interact with a base station when there is a data transmission demand. When there is no data transmission, the MTC equipment and the NB-IoT equipment are in a sleep state which is low power consumed. In the sleep state, the MTC equipment or the NB-IoT equipment is idle or inactive. In this way, when the MTC equipment or the NB-IoT equipment desires to report data, a variety of methods are proposed in the related art on how to report data. As an example, the equipment enters a connected state through the random access process, and performs data interaction with the base station after switching to the connected state. As another example, the early data transmission (EDT) is performed, i.e., the data transmission is completed in the random access procedure without completing the whole random access process, such that the equipment can complete the data interaction without exiting the idle state or inactive state.

In the related art, it is determined whether to adopt the random access manner or the EDT-based manner by the terminal based on a control signaling (order) in the Physical Downlink Control Channel (PDCCH). However, the mechanism of the control signaling in the PDCCH only supports the contention-free access mode, and the base station needs to preset random access preamble for users. Since this mechanism cannot support the contention access mode, the mechanism lacks flexibility. In addition, since the terminal does not know when the base station will send the control signaling through the PDCCH, the terminal needs to search for the control signaling in the search space, resulting in high power consumption overhead of the terminal.

Therefore, embodiments of the disclosure provide methods and devices for processing information, communication devices and storage medium, which will be described in detail below.

FIG. 1 is a schematic diagram illustrating a wireless communication system in accordance with an embodiment of the disclosure. As illustrated in FIG. 1, the wireless communication system is a communication system based on cellular mobile communication technology. The wireless communication system can include terminals 11 and base stations 12.

The terminal 11 may be equipment that provides voice and/or data connectivity to the user. The terminal 11 can communicate with one or more core networks via a radio access network (RAN). The terminal 11 can be an Internet of things (IoT) terminal, such as a sensor device or a mobile phone (or "cellular" phone), and a computer with an IoT terminal, such as a fixed, portable, pocket, handheld, computer built-in, or vehicle-mounted device, such as, station (STA), subscriber unit, subscriber station, mobile station, mobile, remote station, access point, remote terminal, access terminal, user terminal, user agent, user device, or user equipment (UE). Alternatively, the terminal 11 may be a device of an unmanned aerial vehicle. Alternatively, the terminal 11 may be a vehicle-mounted device, such as a trip computer with the wireless communication function or a wireless communication device externally connected to a trip computer. Alternatively, the terminal 11 may be a roadside device, such as a street lamp, a signal lamp or other roadside device with the wireless communication function.

The base station 12 may be a network side device in the wireless communication system. The wireless communication system can be a Fifth-Generation (5G) system, also known as new radio (NR) system or 5G NR system. As an example, the wireless communication system may be a system that supports New Radio-Unlicensed (NR-U) spectrum communication. As another example, the wireless communication system can be a next-generation system of the 5G system. The access network in the 5G system can be called New Generation-Radio Access Network (NG-RAN).

The base station 12 may be called gNB, which adopts a centralized distributed architecture in the 5G system. When the base station 12 adopts the centralized distributed architecture, the base station may include a central unit (CV) and at least two distributed units (DU). The central unit is provided with a protocol stack of Packet Data Convergence Protocol (PDCP), Radio Link Control (RLC), and Medium Access Control (MAC). The distributed unit is provided with a protocol stack of a physical (PHY) layer. Embodiments of the disclosure not limit the implementation form of the base station 12.

A wireless connection can be established between the base station 12 and the terminal 11 through a wireless air interface. In different implementations, the wireless air interface can be a wireless air interface based on the fifth generation (5G) mobile communication network technology standard, such as the new radio, or the wireless air interface can be a wireless air interface based on the next generation mobile communication network technical standard of the 5G standard.

In some embodiments, an E2E (end to end) connection can be established between terminals 11. In some embodiments, the above wireless communication system may also include a network management device 13.

The base stations 12 are respectively connected to the network management device 13. The network management device 13 may be a core network device in the wireless communication system. As an example, the network management device 13 may be a Mobility Management Entity (MME) in an Evolved Packet Core (EPC). As another example, the network management device can be other core network devices, such as Serving GateWay (SGW), Public Data Network GateWay (PGW), Policy and Charging Rules Function (PCRF), Home Subscriber Sserver (HSS), etc. Embodiments of the disclosure do not limit the implementation form of the network management device 13.

Figure 2:
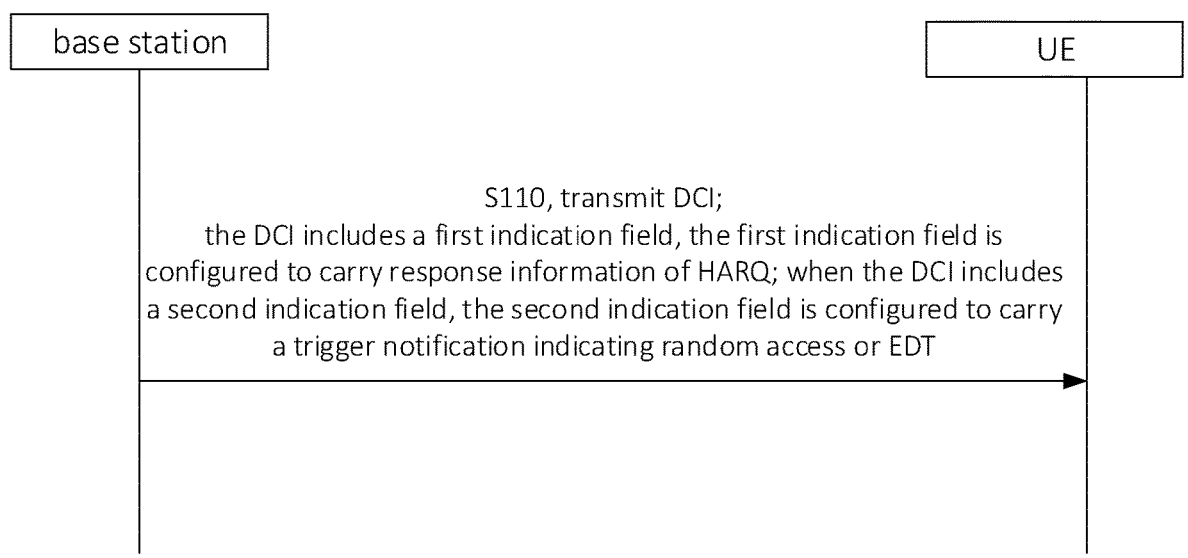
FIG. 2 is a flowchart illustrating a method for processing information in accordance with an embodiment of the disclosure.

As illustrated in FIG. 2, embodiments of the disclosure provide a method for processing information. The method is applied to a base station. The method includes the following.

At block S110, Download Control Information (DCI) is transmitted.

The DCI includes a first indication field. The first indication field is configured to carry response information of Hybrid Automatic Repeat Request (HARQ).

When the DCI also includes a second indication field, the second indication field is configured to carry a trigger notification for performing random access or Early Data Transmission (EDT).

The method is executed by a base station. The base station can be a base station of any cellular communication, such as 3-generation (3G) base station, 4-generation (4G) base station or 5G base station.

The DCI is a kind of downlink control information configured to send a HARQ feedback based on a data reception status. The response information of HARQ includes an acknowledgement character (ACK) or a non-acknowledgement character (NACK).

The DCI is transmitted by the Physical Downlink Control Channel (PDCCH).

In the disclosure, the first indication field in the DCI is configured to carry the response information of HARQ, to indicate the data reception status. For example, when the data is successfully received, the response information carried by the first indication field is the ACK. When the data is not received successfully, the response information carried by the first indication field is the NACK. In this way, after receiving the DCI, the terminal can clearly know which data is successfully transmitted and which data is not received successfully.

In some embodiments, the DCI carries the second indication field. The second indication field is configured to carry the trigger notification. The trigger notification can be a trigger notification for triggering the terminal to communicate with the base station after performing the random access based on a random access channel, or a trigger notification for instructing the terminal to interact with the base station based on the EDT.

In a case that the terminal interacts with the base station based on the EDT, the terminal uploads the data to be transmitted to the base station through a random access message to the base station during the random access procedure to complete the whole random access procedure. Since the random access procedure is not completed when the data is transmitted, the data uploading is completed while the terminal maintains in the idle state or inactive state, to reduce the power consumption of the terminal. For example, the terminal uploads the data to the base station through a third message (MSG3) in the random access procedure. After the data uploading is completed, the subsequent process of the random access procedure is not executed. Therefore, there is no need to switch from the idle state or the inactive state to the connected state.

The terminal can be an IoT terminal.

After receiving the DCI, in a case that the second indication field is contained in the DCI, the terminal can determine, based on a trigger mechanism contained by the DCI when there is data to be uploaded subsequently, an interaction mode in which the terminal transmits the data to the base station based on the second indication field in the DCI. In this way, on the one hand, the base station does not need to use the control signaling of the PDCCH for specific indication, which solves the limitation that the control signaling of the PDCCH only supports the contention-free random access but does not support the contention-based random access, to improve the flexibility of the data interaction mode between the terminal and the base station. On the other hand, once the terminal uploads the data, the terminal can wait to receive the DCI based on scheduling of the response information of HARQ. By carrying the second indication field and the trigger notification in the DCI, the terminal does not need to blindly search in the whole search space of the PDCCH for a long time, to save the power consumption of the terminal.

In some embodiments, the second indication field may include one or more bits. When the second indication field includes one bit, two values of the bit can be used to indicate two states about whether there is the trigger notification or not. As an example, a value of "1" indicates that a trigger notification is included, while a value of "0" indicates that no trigger notification is included. As another example, a value of "0" indicates that a trigger notification is included, while a value of "1" indicates that no trigger notification is included.

In some embodiments, the trigger notification can correspond to one or more bits. When the trigger notification corresponds to one bit, the values of the bit can be configured to indicate whether the trigger notification is a trigger notification indicating the random access or a trigger notification indicating the EDT. As an example, a value of "1" indicates that the trigger notification indicates the random access, while a value of "0" indicates that the trigger notification indicates the EDT. As another example, a value of "0" indicates that the trigger notification indicates the EDT, while a value of "1" indicates that the trigger notification indicates the random access.

Figure 3:
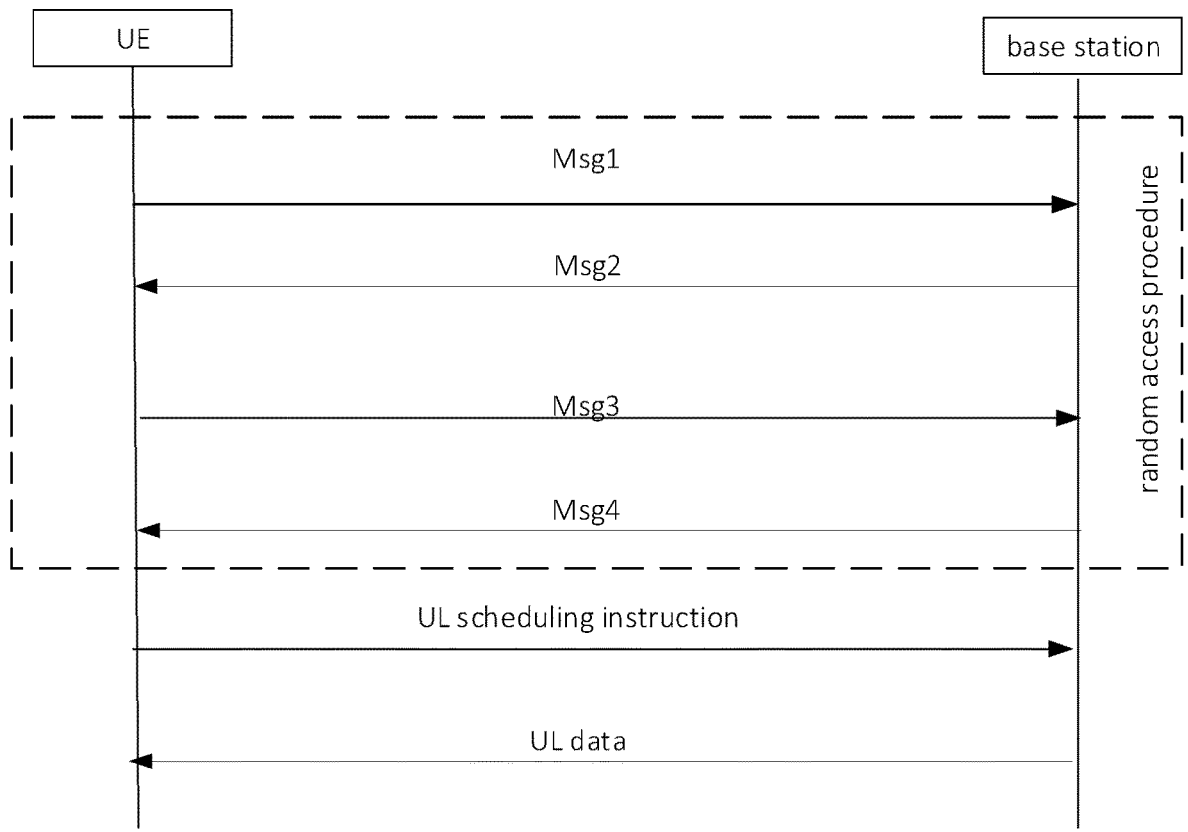
FIG. 3 is a flowchart illustrating a random access procedure in accordance with an embodiment of the disclosure.

An information interaction method between the base station and the terminal illustrated in FIG. 3 includes a random access procedure. The random access procedure includes the following.

The terminal sends a first message (MSG) 1 to the base station. The first message can be a random access request. The random access request carries a random access preamble.

The base station sends back a second message (Msg2) to the terminal based on the first message. The second message can be a random access response. The terminal that receives the random access response can continue the subsequent random access procedure to switch from the idle state or the inactive state to the connected state.

In a case that the terminal receives the second message, the terminal can believe it has a chance to perform the random access and send a third message (Msg3) to the base station.

After receiving the third message, the base station can send a fourth message (Msg4) to the terminal.

After the terminal receives the fourth message, the whole random access procedure is completed. In this way, the terminal can send an Uplink (UL) scheduling instruction to schedule the uplink data transmission.

The UL data is transmitted on the scheduled uplink resources.

Figure 4:
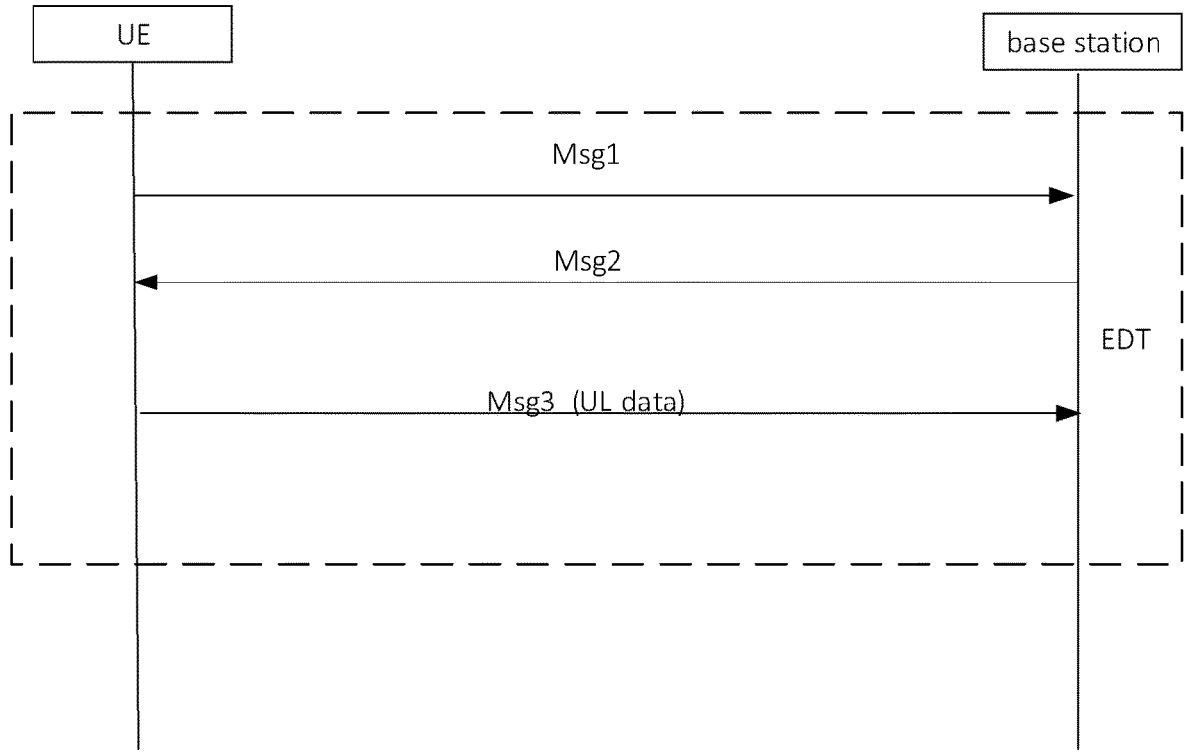
FIG. 4 is a flowchart illustrating a network access based on early data transmission (EDT) in accordance with an embodiment of the disclosure.

FIG. 4 illustrates the EDT, which may include the following.

The terminal sends the Msg1 for the random access to the base station.

The base station sends back the Msg2 to the terminal.

The terminal sends the Msg3 to the terminal based on the second message. The Msg3 can carry the uplink data. In a case that the transmission of the uplink data is completed, the subsequent process of the random access procedure can be terminated directly, and the EDT is completed.

Figure 5:
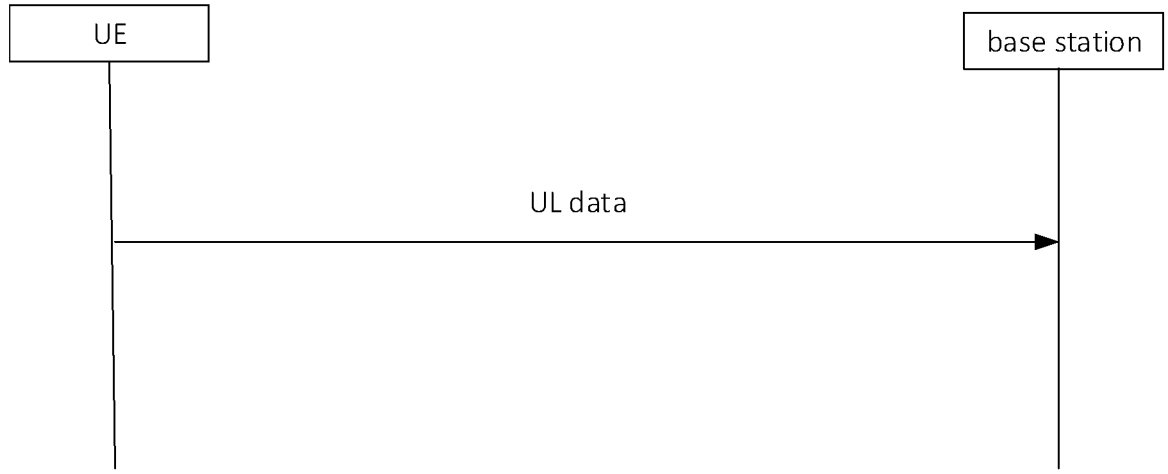
FIG. 5 is a flowchart illustrating a grant-free data scheduling in accordance with an embodiment of the disclosure.

FIG. 5 illustrates another uplink data transmission method of grant-free scheduling. The method can include sending directly the uplink data by the terminal on the resource of grant-free scheduling without performing the random access procedure or using any message of the terminal in the random access procedure.

In some embodiments, the method includes the following.

The DCI in which the first indication field indicates the ACK carries the second indication field, or the DCI in which the first indication filed indicates the NACK carries the second indication field.

The aforementioned "trigger notification" can be carried in the DCI in which the first indication field indicates the ACK or the DCI in which the first indication field indicates the NACK. Which DCI to carry the trigger notification can be negotiated or written into a standard protocol in advance by the base station and the terminal. In this way, when decoding HAR DCI, the terminal can determine whether to decode the second indication field based on the decoding result of the first indication field, to reduce the decoding difficulty, reduce unnecessary decoding operations, and improve the decoding rate of the terminal.

In some embodiments, the base station can configure the DCI to carry the second indication field when the first indication field indicates that the response information is the ACK or the NACK based on a current load condition and transmission requirements.

When the first indication field indicates that the response information is the ACK, the DCI is configured to trigger the terminal to perform the random access or the EDT-based network connection based on the trigger notification when transmitting new data.

When the first indication field indicates that the response information is the NACK, the DCI is configured to trigger the terminal to perform the random access or the EDT-based network connection based on the trigger notification when transmitting data to be retransmitted.

The data transmission of the terminal can be classified as new data transmission or data retransmission. The new data transmission refers to transmitting data that has not been sent by the terminal to the base station. The data retransmission refers to transmitting the data that has been sent at least once by the terminal.

When the DCI includes the trigger notification indicated by the second indication field, whether the trigger notification carried by the DCI is configured to trigger the new data transmission or the data retransmission can be implicitly indicated by the ACK or the NACK indicated by the first indication field, without being indicated separately, which can reduce the bit overhead of the DCI and save the number of signaling compared with the explicit indication.

For example, in a case that the first indication field indicates the ACK, the next new data can be transmitted by the terminal based on an interaction mode, in which the terminal interacts with the base station, indicated by the trigger notification carried by the DCI.

In a case that the first indication field indicates the NACK, it indicates that the terminal needs to retransmit the data, and the data to be retransmitted is uploaded to the base station in an interactive mode indicated by the trigger notification carried by the DCI.

In some embodiments, when the DCI includes the second indication field, the DCI also includes a third indication field.

The third indication field is configured to indicate a random access type. The random access type includes contention-based random access and contention-free random access.

In a case where the second indication field indicates that the DCI includes the trigger notification for performing the random access, when there is data to be transmitted after the terminal receives the DCI, the terminal can perform the random access procedure, switch from the idle state or the inactive state to the connected state, and report the data to be transmitted to the base station. However, there are many types of random access, at least including the contention-based random access and the contention-free random access.

In the contention-based random access procedure, the base station broadcasts the random access preamble. In this way, a plurality of terminals will receive the same random access preamble. When a terminal needs to perform the random access procedure subsequently, the terminal can randomly select its own random access preamble. Therefore, at the same random access moment, the plurality of terminals may select the same random access preamble such that the contention state of random access is caused. This random access procedure is called the contention-based random access procedure.

In the contention-free random access procedure, the base station sends the random access preamble to a terminal through specific signaling. Since the random access preamble is sent by the specific signaling, other terminals cannot know the random access preamble. Therefore, when the terminal needs to perform the random access procedure, the terminal carries out the random access procedure with the random access preamble sent through the specific signaling, which does not cause confliction and contention with the random access procedures of other terminals. Therefore, this random access procedure is called the contention-free random access procedure.

In the disclosure, the third indication field is configured to indicate the random access type.

In some embodiments, the third indication field may include one or more bits. The one or more bits are configured to indicate the random access type. For example, the third indication field can include one bit, and two values of the bit are configured to indicate two random access types. The third indication field including one bit, on the one hand, realizes the indication of the random access type, and on the other hand, adopts the least number of indication bits to reduce the signaling overhead.

In some embodiments, when the random access type indicated by the third indication field is the contention-based random access, the DCI is further configured to indicate an initial coverage enhancement level.

When the random access type indicated by the third indication field is the contention-free random access, the DCI is further configured to indicate a preamble index, a physical random access channel (RACH) mask index, and the initial coverage enhancement level.

The initial coverage enhancement level can be configured to indicate a transmission power of initially transmitting a random access request during the random access procedure. In the random access procedure, in a case that the previous random access fails, the coverage enhancement level is changed to realize the successful random access by increasing the transmission power.

In embodiments of the disclosure, in order to reduce interferences caused by the random accesses of a large number of terminals with a large initial coverage enhancement level, the base station can indicate the initial coverage enhancement level through the DCI. On the one hand, it is convenient for the base station to differentially process a respective initial coverage enhancement level of each terminal according to the current wireless condition and the urgency degree of uploading the data by the terminal. On the other hand, the base station participates in the control to reduce various wireless environment chaos related to the initial coverage enhancement level.

The RACH mask index is configured to indicate the RACH. The random access resources of the RACH used by different RACHs are different.

For the contention-free random access, in order to avoid random access contention, the specific preamble used in the random access and the specific random access channel can be indicated for the terminal. The specific preamble and the specific random access channel are carried at one time through the DCI, which facilitates the reception for the terminal. For example, the specific preamble used by the terminal in the contention-free random access is indicated by the preamble index, and the specific random access channel used in the contention-free random access is indicated by the RACH mask index.

Table 1 illustrates a correspondence between the RACH mask index, the random access channel, and the random access resources.

In this way, when there is the reserved resource configured for the terminal for data transmission and the terminal does not need to transmit data based on the random access or the EDT, the DCI may not include the second indication field. After receiving the DCI, the terminal can directly transmit data on the position corresponding to the reserved resource according to the content of DCI.

Figure 6:
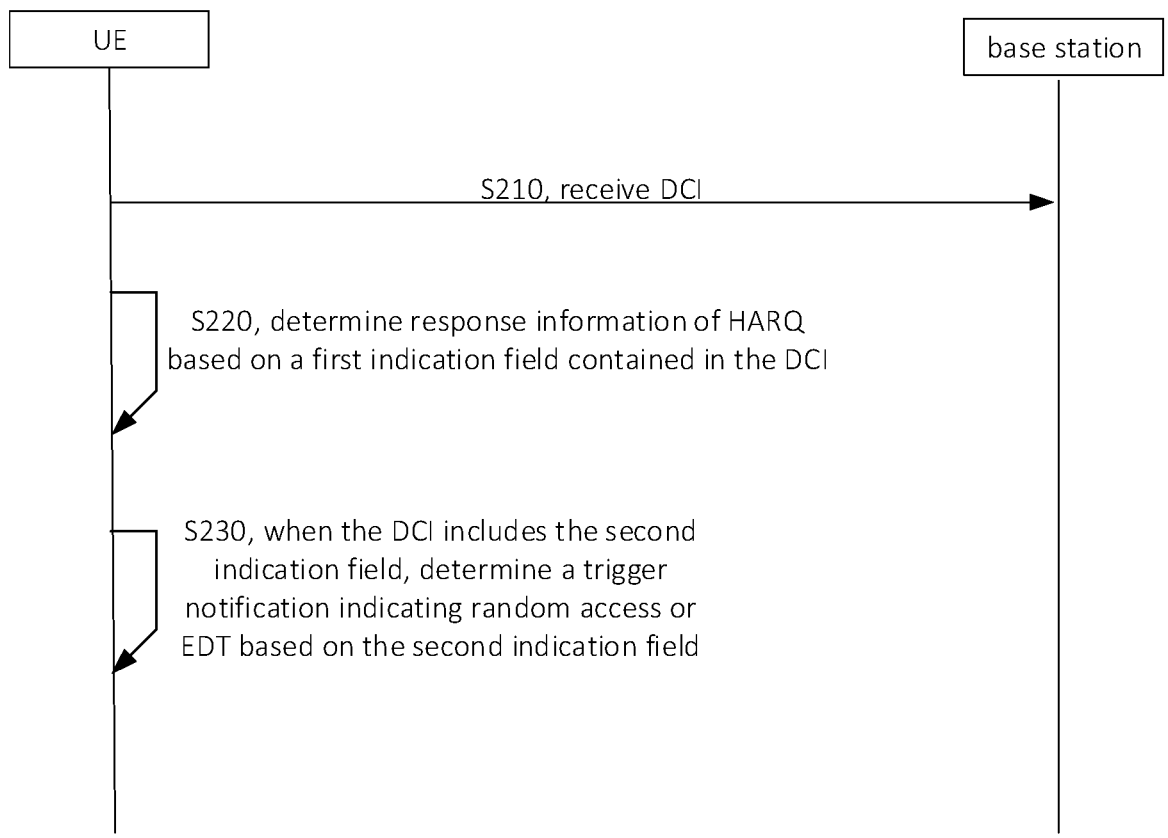
FIG. 6 is a flowchart illustrating a method for processing information in accordance with an embodiment of the disclosure.

As illustrated in FIG. 6, embodiments of the disclosure provide a method for processing information. The method is applied to a terminal. The method includes the following.

At block S210, DCI is received.

At block S220, response information of HARQ is determined based on a first indication field contained in the DCI. The response information of HARQ can be an ACK or a NACK.

At block S230, when the DCI includes a second indication field, a trigger notification that the random access or the EDT is performed is determined based on the second indication field.

The terminal includes, but is not limited to, MTC equipment or NB-IoT equipment.

When receiving the DCI, the terminal can know whether the data previously reported to the base station has been successfully transmitted based on the first indication field. When the DCI includes the second indication field, it can be

TABLE 1

| RACH mask index | available random access resources corresponding to frequency division multiplexing | available random access resources corresponding to time division multiplexing |
|---|---|---|
| 0 | all random access resources | all random access resources |
| 1 | PRACH resource 0 | PRACH resource 0 |
| 2 | PRACH resource 1 | PRACH resource 1 |
| 3 | PRACH resource 2 | PRACH resource 2 |
| 4 | PRACH resource 3 | PRACH resource 3 |
| 5 | PRACH resource 4 | PRACH resource 4 |
| 6 | PRACH resource 5 | PRACH resource 5 |
| 7 | PRACH resource 6 | reserved (null) |
| 8 | PRACH resource 7 | reserved (null) |
| 9 | PRACH resource 8 | reserved (null) |
| 10 | PRACH resource 9 | reserved (null) |
| 11 | a first PRACH resource within a $k^{th}$ subframe in the time domain | a first PRACH resource within subframes of a $2n^{th}$ random access opportunity in time domain, where n is an integer |
| 12 | a first PRACH resource within subframes of a $(2n - 1)^{th}$ random access opportunity in the time domain, where n is an integer | a first PRACH resource within subframes of (2n + 1)th random access opportunity in time domain, where n is an integer |
| 13 | reserved (null) | a first PRACH resource within subframes |
| 14 | reserved (null) | a second PRACH resource within subframes |
| 15 | reserved (null) | a third PRACH resource within subframes |

For example, it can be seen from the table that the random access channel mask index 3 corresponds to the PRACH resource 2. That is, the preamble is sent through the third PRACH resource in the system frame.

In some embodiments, when the DCI does not include the second indication field, the DCI is configured to trigger the terminal to perform the new data transmission or the data retransmission on a reserved resource.

For example, when the DCI does not contain the second indication field and the first indication field indicates the ACK, the terminal is triggered to perform the new data transmission on the reserved resource. When the DCI contains the second indication field and the first indication field indicates the NACK, the terminal is triggered to perform the data retransmission on the reserved resource.

determined whether the current DCI includes the trigger notification based on the second indication field. When the trigger notification is included, the data can be uploaded to the base station by selecting the random access or the EDT based on the trigger notification in a case that there is a data transmission demand next time.

In some embodiments, the second indication field is carried in the DCI in which the first indication field indicates the ACK, or the second indication field is carried in the DCI in which the first indication field indicates the NACK.

The method further includes the following.

Figure 7A:
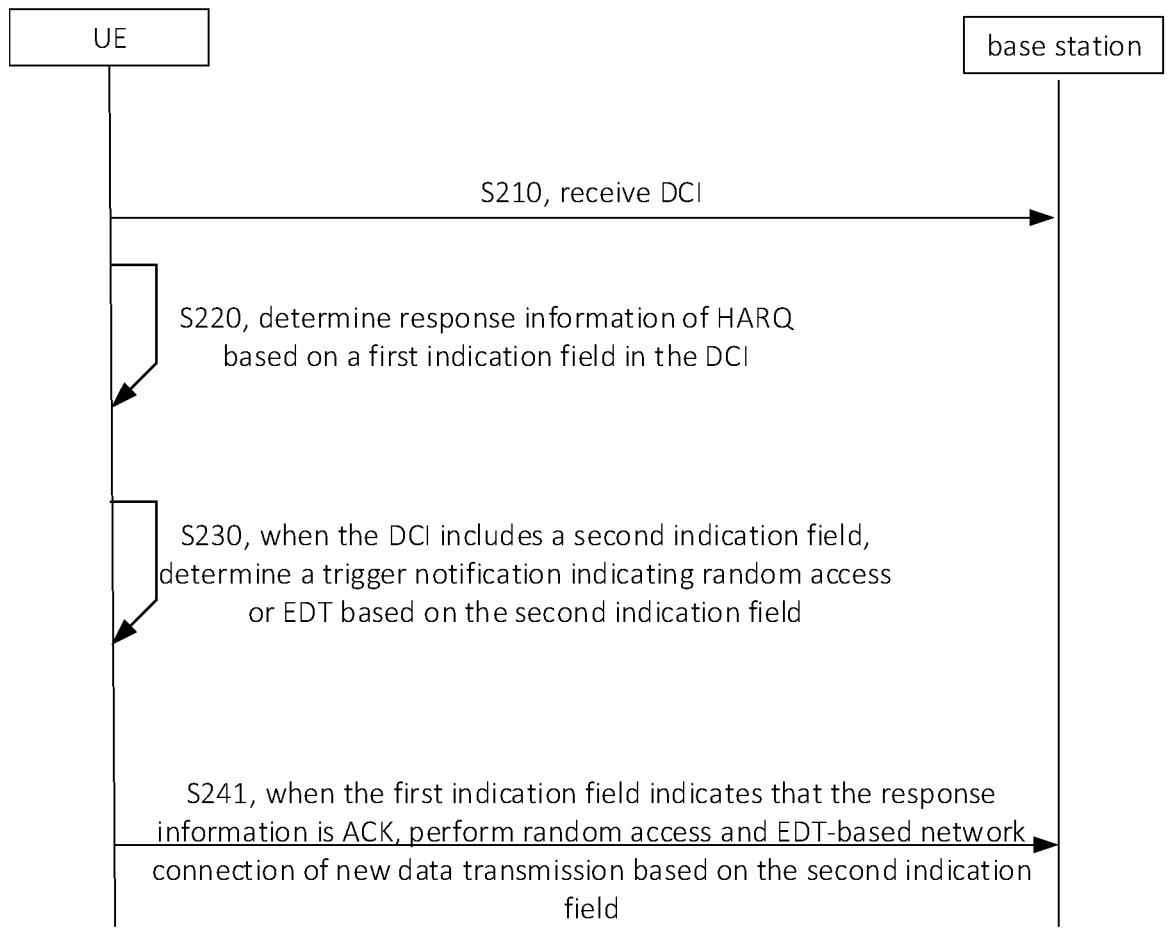
FIG. 7A is a flowchart illustrating a method for processing information in accordance with an embodiment of the disclosure.

As illustrated in FIG. 7A, at block S241, when the first indication field indicates that the response information is the ACK, the random access procedure or the EDT-based network connection of the new data transmission is performed based on the second indication field.

Alternatively, the method may include the following.

Figure 7B:
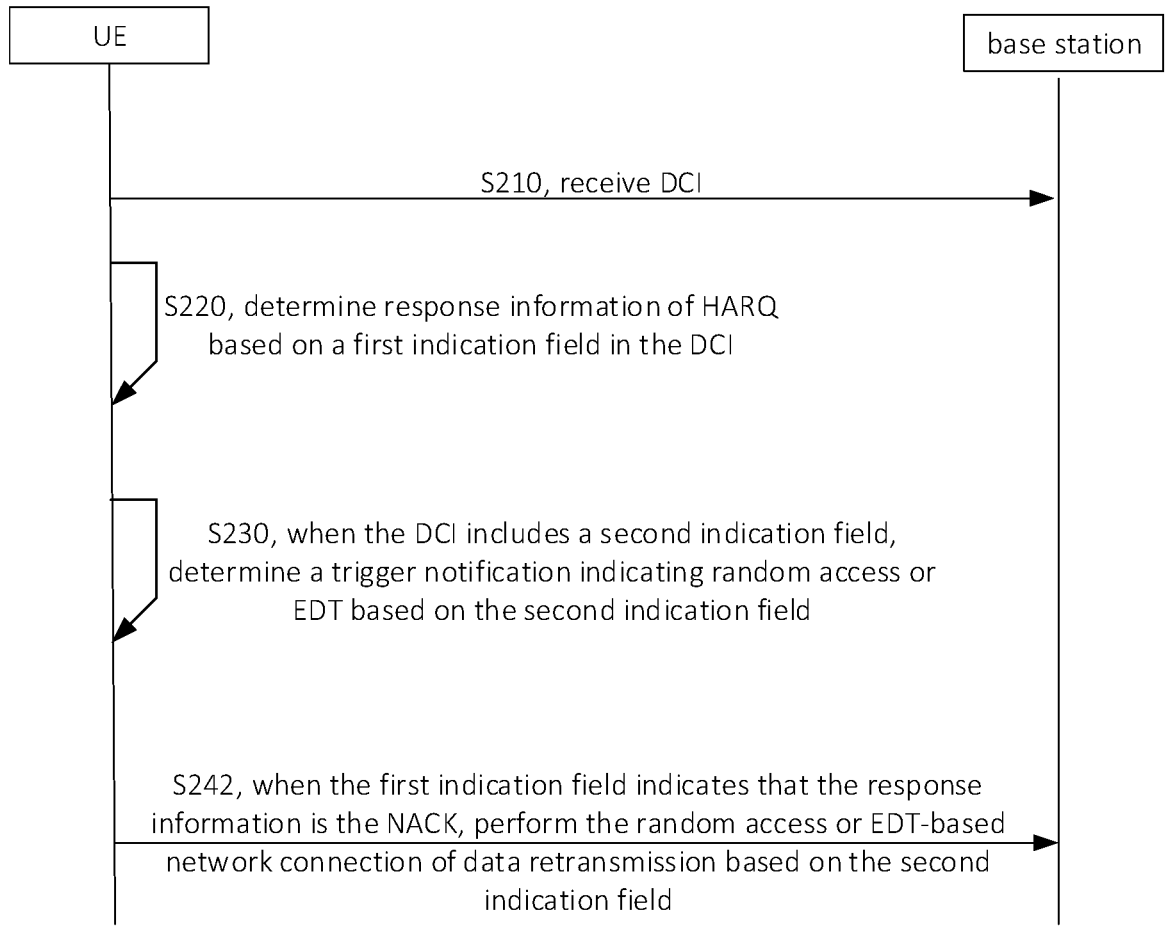
FIG. 7B is a flowchart illustrating a method for processing information in accordance with an embodiment of the disclosure.

As illustrated in FIG. 7B, at block S242, when the first indication field indicates that the response information is the NACK, the random access procedure or the EDT-based network connection of the data retransmission is performed based on the second indication field.

According to the current situation, the trigger notification can be carried in the DCI indicating the ACK and/or the NACK, to instruct the terminal to adopt the interaction mode to interact with the base station for the new data transmission and the data retransmission.

The EDT-based network connection may include: completing an interaction procedure after the first message to the third message of the random access procedure between the terminal and the base station, and reporting the data to be transmitted through the third message of the random access procedure to the base station.

Carrying the trigger notification in the DCI indicating the corresponding response information of HARQ implicitly indicates that the interaction mode between the terminal and the base station triggered by the current trigger notification is used for the new data transmission or the data retransmission, without occupying a specific bit, to save the signaling overhead.

In some embodiments, when the DCI includes the second indication field, the DCI further includes a third indication field.

The method further includes determining a random access type based on the third indication field. The random access type includes contention-based random access and contention-free random access.

When the trigger notification triggers the terminal to perform the random access, the DCI can also include the third indication field.

The third indication field is configured to indicate the random access type. Relevant introduction of the contention-based random access and the contention-free random access can refer to the foregoing embodiments, which are not repeated here.

In this way, the base station can select the random access type for the terminal based on the current allocation of random access resources, the urgency degree of service, and the data volume of the terminal, and send the random access type to the terminal through the third indication field included in the DCI. In this way, the terminal can receive the DCI including the third indication field based on the DCI, to select a corresponding random access type based on the third indication field to complete the random access. The terminal is switched from the idle state or inactive state to the connected state after the random access and perform the new data transmission or the data retransmission in the connected state.

In some embodiments, the method further includes the following.

An initial coverage enhancement level is determined based on the DCI when the random access type indicated by the third indication field is the contention-based random access.

Alternatively, the method further includes the following.

When the random access type indicated by the third indication field is the contention-free random access, the preamble index, the PRACH mask index, and the initial coverage enhancement level are determined based on the DCI.

In some embodiments, the DCI further includes a fourth indication field. The fourth indication field can be configured to indicate random access parameters. The random access parameters can be resource parameters to be used in the random access procedure or parameters to be referenced in the random access procedure. The random access parameters include, but are not limited to, the aforementioned initial coverage enhancement level, preamble index, random access channel mask index, etc.

In embodiments of the disclosure, the random access parameters are related to the random access type. When the random access type is the contention-based random access, the fourth indication field of the DCI can be configured to indicate only the initial coverage enhancement level. The random access preamble and random access channel mask index used in the contention-based random access procedure can be carried in the broadcast message and sent to the terminal. In this way, it is possible to avoid repeatedly transmitting the DCI.

When the random access type is the contention-free random access, since the random access preamble and the random access channel need to be configured separately, for indicating again, in embodiments of the disclosure, these indications will be completed by the DCI uniformly. In this way, when the terminal needs to initiate the random access, the random access can be completed directly based on the parameters carried by the DCI.

In some embodiments, the method further includes the following.

When the DCI does not contain the second indication field and the first indication field indicates the ACK, the new data transmission is performed on the reserved resource.

Alternatively, the method further includes the following.

When the DCI does not include the second indication field and the first indication field indicates the NACK, the data retransmission is performed on the reserved resource.

The reserved resource can be configured by the base station for the terminal in advance to report the data by the terminal. For example, when the terminal is in the sleep state periodically, the base station configures the reserved resource within the time period when the terminal is in the wake-up state based on the sleep cycle of the terminal, such that the terminal sends the new data and/or the data to be retransmitted on the reserved resource.

In embodiments of the disclosure, the DCI can include the second indication field or not include the second indication field. The terminal can determine how to interact with the base station according to whether the received DCI includes the second indication field, to realize the management and control of the data reporting mode of the base station to the terminal and solve a problem of the low success rate of data reception caused by the random selection of the terminal.

Figure 8:
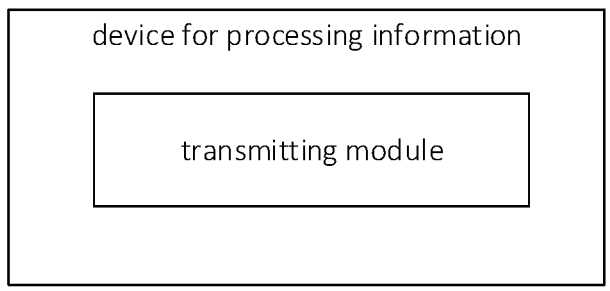
FIG. 8 is a block diagram illustrating a device for processing information in accordance with an embodiment of the disclosure.

As illustrated in FIG. 8, the disclosure provides a device for processing information. The device is applied to a base station. The device includes a transmitting module.

The transmitting module is configured to transmit DCI.

The DCI includes a first indication field. The first indication field is configured to indicate response information of HARQ.

When the DCI further includes a second indication field, the second indication field is configured to carry a trigger notification for performing random access or EDT.

The device for processing information according to embodiments of the disclosure includes the transmitting module configured to transmit the DCI. The DCI transmitted by the transmitting module can include the second indication field or not include the second indication field.

In some embodiments, the transmitting module may be a program module. After the program module is executed by a processor, the transmission of the DCI can be implemented.

In other embodiments, the transmitting module may be a combination of software and hardware. The combination of software and hardware can include various programmable arrays. The programmable array includes, but is not limited to, complex programmable array or field programmable array.

In other embodiments, the transmitting module may be a pure hardware module. The pure hardware module includes but is not limited to an application specific integrated circuit.

In some embodiments, the device further includes a storage module. The storage module is configured to store the DCI.

In some embodiments, when the first indication field indicates that the response information is the ACK, the DCI carries the second indication field, or, when the first indication field indicates that the response information is the NACK, the DCI carries the second indication field.

In some embodiments, when the first indication field indicates that the response information is the ACK, the DCI is configured to trigger the terminal to perform the random access or the EDT-based network connection based on the second indication field when there is the new data transmission.

When the first indication field indicates that the response information is the NACK, the DCI is configured to trigger the terminal to perform the random access or the EDT-based network connection based on the trigger notification when there is the data to be transmitted.

In some embodiments, when the DCI includes the second indication field, the DCI further includes a third indication field.

The third indication field is configured to indicate the random access type. The random access type includes contention-based random access and contention-free random access.

In some embodiments, when the random access type indicated by the third indication field is the contention-based random access, the DCI is further configured to indicate the initial coverage enhancement level.

When the random access type indicated by the third indication field is the contention-free random access, the DCI is further configured to indicate the preamble index, the physical random access channel mask index, and the initial coverage enhancement level.

In some embodiments, when the DCI does not include the second indication field, the DCI is configured to trigger the terminal to perform the new data transmission or the data retransmission on the reserved resource.

Figure 9:
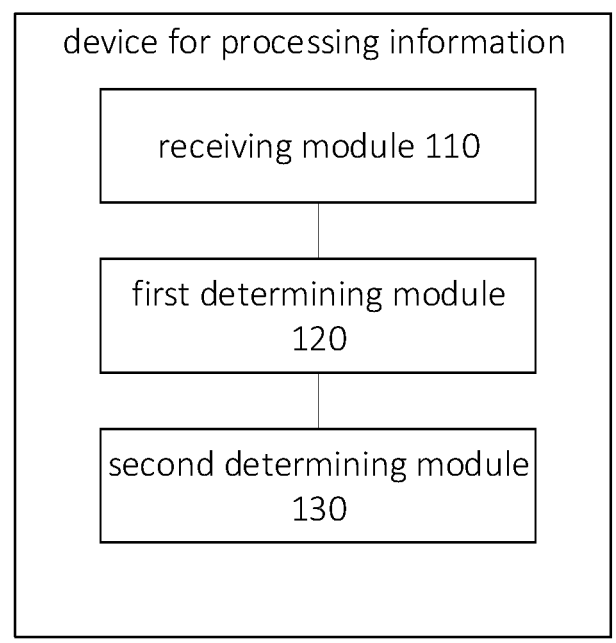
FIG. 9 is a block diagram illustrating a device for processing information in accordance with an embodiment of the disclosure.

As illustrated in FIG. 9, embodiments of the disclosure provide a device for processing information. The device is applied to a terminal. The device includes a receiving module 110, a first determining module 120, and a second determining module 130.

The receiving module 110 is configured to receive the DCI.

The first determining module 120 configured to determine the response information of HARQ based on the first indication field contained in the DCI.

The second determining module 130 is configured to determine the trigger notification for performing the random access or the EDT based on the second indication field when the DCI includes the second indication field.

In some embodiments, the receiving module 110, the first determining module 120, and the second determining module 130 may all be program modules. After the program modules are executed by a processor, the reception of the DCI, the determination whether the response information is the ACK or the NACK based on the first indication field, and the determination whether the DCI carries the trigger notification for the random access or the EDT based on the second indication field can be implemented.

In other embodiments, the receiving module 110, the first determining module 120, and the second determining module 130 may all be a combination of software and hardware. The combination of software and hardware includes but is not limited to a programmable array. The programmable array may include a field programmable array or a complex programmable array.

In other embodiments, the receiving module 110, the first determining module 120, and the second determining module 130 may all be pure hardware modules. The pure hardware module includes but is not limited to application specific integrated circuit.

In some embodiments, when the first indication field indicates that the response information is the ACK, the DCI carries the second indication field, or, when the first indication field indicates that the response information is the NACK, the DCI carries the second indication field.

In some embodiments, the device further includes a first connecting module.

The first connecting module is configured to perform the random access or the EDT-based network connection of the new data transmission based on the second indication field when the first indication field indicates that the response information is the ACK.

Alternatively, the device includes a second connecting module.

The second connecting module is configured to perform the random access or the EDT-based network connection of the data retransmission based on the second indication field when the first indication field indicates that the response information is the NACK.

In some embodiments, when the DCI includes the second indication field, the DCI further includes a third indication field.

The device further includes a third determining module.

The third determining module is configured to determine a random access type based on the third indication field. The random access type includes contention-based random access and contention-free random access.

In some embodiments, the device further includes a fourth determining module and a fifth determining module.

The fourth determining module is configured to determine an initial coverage enhancement level based on the DCI when the random access type indicated by the third indication field is the contention-based random access.

The fifth determining module is configured to determine the preamble index, the physical random access channel mask index, and the initial coverage enhancement level based on the DCI when the random access type indicated by the third indication field is the contention-free random access.

In some embodiments, the device further includes a first transmitting module.

The first transmitting module is configured to perform the new data transmission on the reserved resource when the DCI does not contain the second indication field and the first indication field indicates the ACK.

Alternatively, the device further includes a second transmitting module.

The second transmitting module is configured to perform the data retransmission on the reserved resource when the DCI does not contain the second indication field and the first indication field indicates the NACK.

Several specific examples are provided below in connection with any of the foregoing embodiments.

In some examples, after the terminal sends the data on the reserved resource configured by the base station, the base station can determine the response information of HARQ based on the feedback result. The response information of HARQ is determined based on the PDCCH transmission result.

The trigger for the RACH/EDT is placed in the PDCCH to support both the contention-based on random access and the contention-free random access.

A field in the DCI is configured to distinguish whether the response information of the current DCI is the ACK or the NACK.

A field in the DCI is configured to indicate whether the trigger notification for the RACH/EDT is included in the current DCI.

In some cases, the trigger notification may be contained in the DCI indicating the ACK, in the DCI indicating the NACK, or in both the DCIs indicating the ACK and the NACK.

When there is the trigger notification indicating the RACH/EDT in the DCI, the DCI may further include a field indicating the random access type.

For the contention-free random access, the DCI needs to further include the preamble index, the PRACH mask and the initial coverage enhancement level. For the contention-based random access, the initial coverage enhancement level can be included in the DCI.

For the DCI indicating the ACK, in a case that there is a trigger notification in the DCI, the terminal can perform the random access or the EDT-based network connection when there is data to be transmitted, and transmits the new data based on the indication after the connection.

For the DCI indicating the NACK, when there is a trigger notification in the DCI, the terminal performs the random access/EDT again to retransmit the data.

When there is no trigger notification for the RACH/EDT in the DCI, for the terminal receiving the DCI indicating the ACK, when there is new data, the data needs to be transmitted on the reserved resource of the base station. For the terminal receiving the DCI indicating the NACK, the data needs to be retransmitted on the resource indicated in DCI in an indicated mode.

Figure 10:
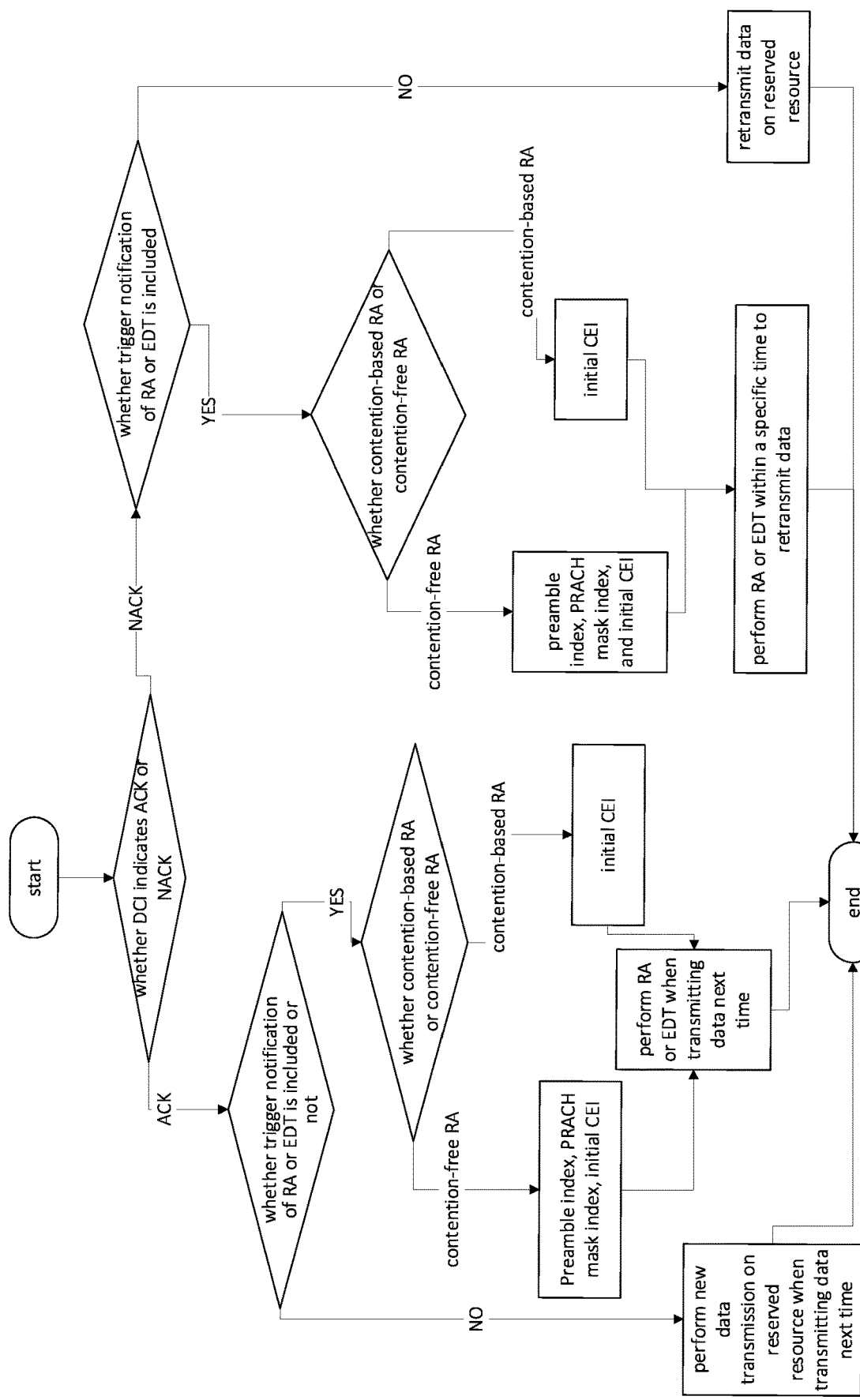
FIG. 10 is a flowchart illustrating a method for processing information in accordance with an embodiment of the disclosure.

In some examples, as illustrated in FIG. 10, this example provides a method for processing information. The method is applied to a terminal. The method includes the following.

It is determined whether the DCI indicates the ACK or the NACK after receiving the DCI.

In a case where the DCI indicates the ACK, it is determined whether the DCI contains the trigger notification for the random access or the EDT.

In a case that the trigger notification is included, it is determined whether the random access type indicated by DCI is the contention-based random access or the contention-free random access.

For the contention-free random access, the method includes the following.

The preamble index, PRACH mask index, and the initial coverage enhancement level indicated by the DCI are obtained.

For the contention-based random access, the initial coverage enhancement level is further obtained from the DCI.

When the data needs to be transmitted next time, the random access or the EDT-based network connection can be performed based on trigger notification.

In a case that the DCI does not contain a trigger notification, when the date needs to be transmitted next time, the new data transmission is performed on the reserved resource.

When the DCI indicates the NACK, it is determined whether the DCI includes the trigger notification for performing the random access or the EDT.

When the DCI includes the trigger notification, it is determined whether the random access type indicated by the DCI is the content-based random access or the contention-free random access.

For the contention-free random access, the preamble index, the PRACH mask index, and the initial coverage enhancement level indicated by the DCI are obtained.

For the contention-based random access, the initial coverage enhancement level indicated by the DCI is obtained.

In a case that the DCI does not contain the trigger notification, the data retransmission is performed on the reserved resource.

A communication device according to embodiments of the disclosure includes a transceiver, a memory and a processor. The transceiver is configured to interact with other devices. The transceiver includes, but is not limited to a transceiver antenna. The memory is configured to store computer executable instructions. The processor is respectively connected with the transceiver and the memory, to realize the uplink control information processing method according to any of the above technical solutions.

In some embodiments, a non-transitory computer-readable storage medium including instructions, such as a memory including instructions, is provided. The instructions can be executed by the processor, and the processor executes the instructions to implement the method for processing information according to any of the above technical solutions.

With the technical solution according to embodiments of the disclosure, when the DCI includes the second indication field, it indicates that the DCI carries the trigger notification for performing the random access or the EDT. On the one hand, it is not necessary to use the control signaling of PDCCH for indication, thereby solving a problem that the control signaling of the PDCCH only supports the contention-free random access but does not support the contention-based random access and improving the flexibility of the data interaction mode between the terminal and the base station. On the other hand, once the terminal reports data, the terminal can wait to receive the DCI based on the scheduling of the response information of HARQ. By carrying the second indication field and trigger notification in the DCI, the terminal does not need to blindly search in the whole search space of the PDCCH for a long time, thereby saving the power consumption of the terminal.

Figure 11:
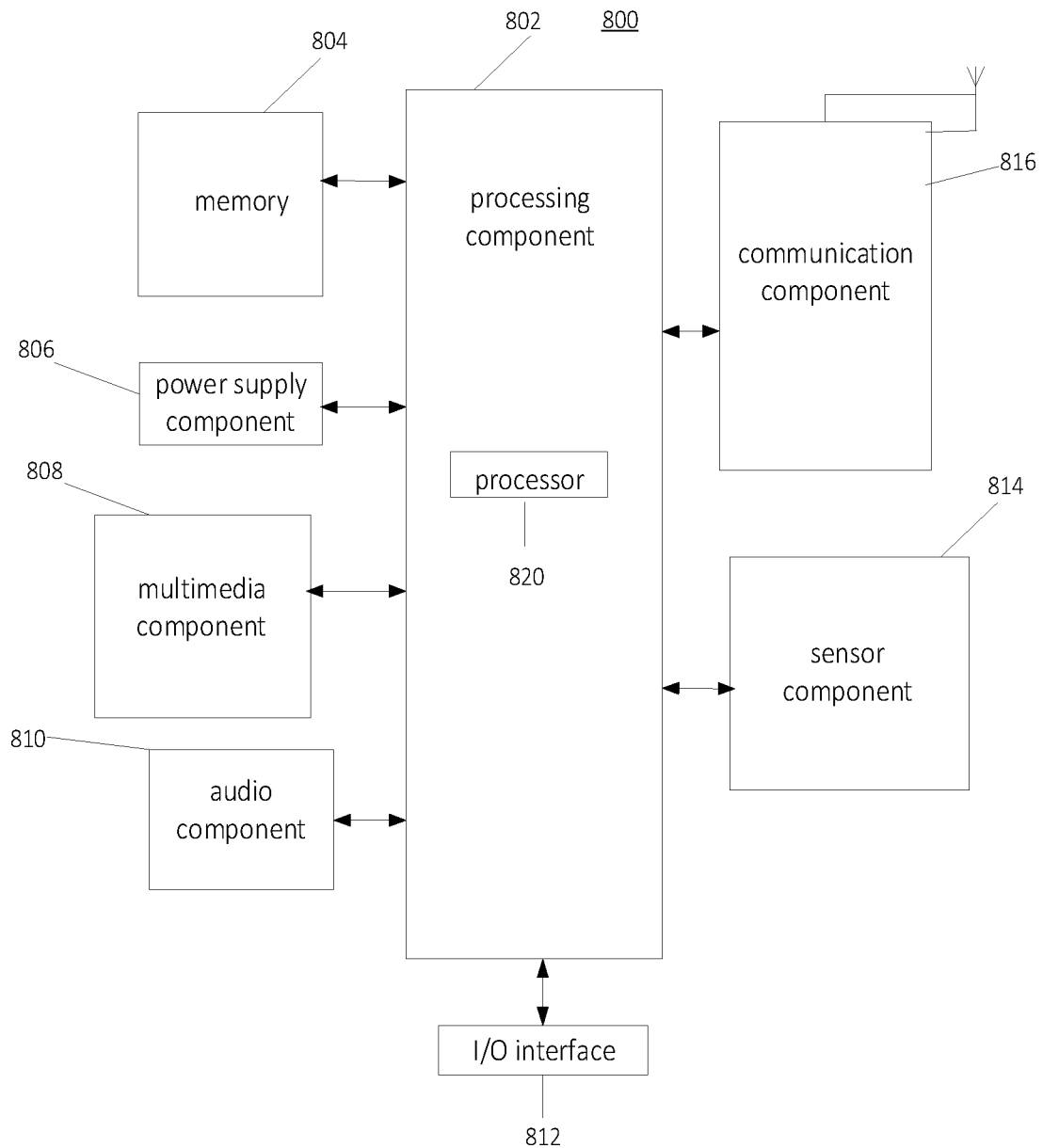
FIG. 11 is a schematic diagram illustrating a terminal in accordance with an embodiment of the disclosure.

FIG. 11 is a schematic diagram illustrating terminal in accordance with an embodiment of the disclosure. The terminal can be a mobile phone, a computer, a digital broadcasting terminal, a messaging device, a game console, a tablet device, a medical device, a fitness device, a personal digital assistant, etc.

As illustrated in FIG. 11, the terminal 800 may include one or more of the following components: processing component 802, memory 804, power supply component 806, multimedia component 808, audio component 810, input/ output (I/O) interface 812, sensor component 814, and communication component 816.

The processing component 802 typically controls the overall operation of the terminal 800, such as operations associated with display, telephone call, data communication, camera operation, and recording operation. The processing component 802 may include one or more processors 820 to execute instructions to complete all or part of the steps of the above method. In addition, the processing component 802 may include one or more modules to facilitate the interaction between the processing component 802 and other components. For example, the processing component 802 may include a multimedia module to facilitate interaction between the multimedia component 808 and the processing component 802.

The memory 804 is configured to store various types of data to support operations of the terminal 800. Examples of these data include instructions for any application or method operating on the terminal 800, contact data, phonebook data, messages, pictures, videos, etc. The memory 804 may be implemented by any type of volatile or nonvolatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, Disk or disc.

The power supply component 806 provides power to various components of the terminal 800. The power supply component 806 may include a power management system, one or more power supplies, and other components associated with generating, managing, and distributing power to the terminal 800.

The multimedia component 808 includes a screen that provides an output interface between the terminal 800 and the user. In some embodiments, the screen may include a liquid crystal display (LCD) and a touch panel (TP). If the screen includes a touch panel, the screen can be implemented as a touch screen to receive an input signal from the user. The touch panel includes one or more touch sensors to sense touch, sliding and gestures on the touch panel. The touch sensor can not only sense the boundary of the touch or slide action, but also detect the duration and pressure related to the touch or slide operation. In some embodiments, the multimedia component 808 includes a front camera and/or a rear camera. When the terminal 800 is in an operation mode, such as shooting mode or video mode, the front camera and/or rear camera can receive external multimedia data. Each front camera and rear camera can be a fixed optical lens system or have focal length and optical zoom capability.

The audio component 810 is configured to output and/or input audio signals. For example, the audio component 810 includes a microphone (MIC) configured to receive external audio signals when the terminal 800 is in an operating mode, such as a call mode, a recording mode, and a speech recognition mode. The received audio signal may be further stored in the memory 804 or transmitted via the communication component 816. In some embodiments, the audio component 810 also includes a speaker for outputting an audio signal.

The I/O interface 812 provides an interface between the processing component 802 and the peripheral interface module, which can be a keyboard, click wheel, button, etc. These buttons may include, but are not limited to, home button, volume button, start button and lock button.

The sensor assembly 814 includes one or more sensors for providing various aspects of condition evaluation for the terminal 800. For example, the sensor assembly 814 can detect the opening/closing state of the terminal 800, the relative positioning of the components, such as the display and keypad of the terminal 800. The sensor assembly 814 can also detect the position change of the terminal 800 or a component of the terminal 800, the presence or absence of the user's contact with the terminal 800, the orientation or acceleration/deceleration of the terminal 800 and the temperature change of the terminal 800. The sensor assembly 814 may include a proximity sensor configured to detect the presence of nearby objects without any physical contact. The sensor assembly 814 may also include a light sensor, such as a CMOS or CCD image sensor, for use in imaging applications. In some embodiments, the sensor assembly 814 may also include an acceleration sensor, a gyroscope sensor, a magnetic sensor, a pressure sensor, or a temperature sensor.

The communication component 816 is configured to facilitate wired or wireless communication between the terminal 800 and other devices. The terminal 800 may access a wireless network based on communication standards, such as WiFi, 2G or 3G, or a combination thereof. In one embodiment, the communication component 816 receives broadcast signals or broadcast related information from an external broadcast management system via a broadcast channel. In an embodiment, the communication component 816 also includes a near-field communication (NFC) module to facilitate short-range communication. For example, the NFC module can be implemented based on radio frequency identification (RFID) technology, infrared data association (IrDA) technology, ultra wideband (UWB) technology, Bluetooth (BT) technology and other technologies.

In an embodiment, the terminal 800 may be implemented by one or more application specific integrated circuits (ASICs), digital signal processors (DSPS), digital signal processing devices (dspds), programmable logic devices (PLDs), field programmable gate arrays (FPGAs), controllers, microcontrollers, microprocessors, or other electronic components for performing the above methods.

In some embodiments, a non-transitory computer-readable storage medium including instructions, such as a memory 804 including instructions, is provided. The instructions can be executed by the processor 820 of the terminal 800 to complete the above method. For example, non-transitory computer-readable storage medium may be ROM, random access memory (RAM), CD-ROM, magnetic tape, floppy disk, optical data storage device, etc.

Figure 12:
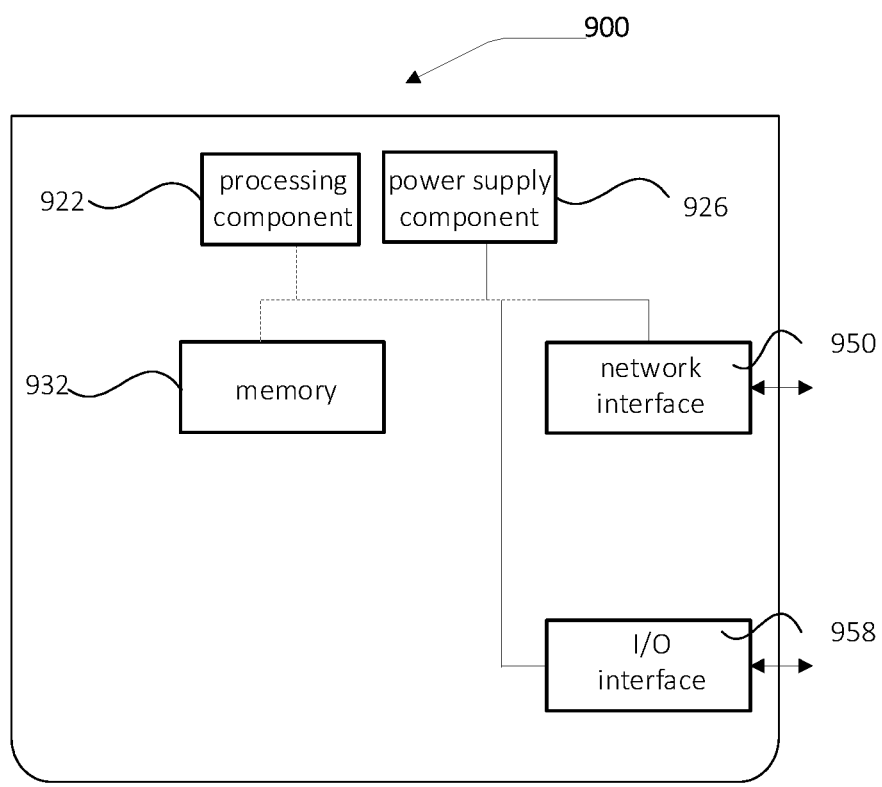
FIG. 12 is a schematic diagram illustrating a base station in accordance with an embodiment of the disclosure.

FIG. 12 is a schematic diagram illustrating a base station. As illustrated in FIG. 12, the base station 900 includes a processing component 922, which further includes one or more processors and memory resources represented by the memory 932 for storing instructions executable by the processing component 922, such as applications. The application stored in the memory 932 may include one or more modules, each corresponding to a set of instructions. In addition, the processing component 922 is configured to execute instructions to execute the PDCCH listening method as illustrated in FIG. 4 and/or FIG. 5.

The base station 900 may also include a power supply component 926 configured to perform power management of the base station 900, a wired or wireless network interface 950 configured to connect the base station 900 to the network, and an input/output (I/O) interface 958. The base station 900 may operate an operating system based on an operating system stored in the memory 932, such as Windows Server™, Mac OS X™, UNIX™, Linux™, free bsdtm, or the like.

After considering the description and practicing the disclosure disclosed herein, those skilled in the art will easily think of other embodiments. This disclosure aims to cover any variation, use or adaptive change thereof, which follows the general principles of this disclosure and includes the common general knowledge or frequently used technical means in the technical field not discussed in this disclosure. The description and embodiments are only regarded as exemplary, and the true scope and spirit of the disclosure are pointed out by the following claims.

It is to be understood that the disclosure is not limited to the precise structure described above and shown in the drawings, and various modifications and changes can be made without departing from its scope. The scope of this disclosure is limited only by the appended claims.

What is claimed is:

1. A method for processing information, comprising:
transmitting, by a base station, Downlink Control Information (DCI), wherein the DCI comprises a first indication field configured to carry response information of Hybrid Automatic Repeat Request (HARQ); and
in response to determining that the DCI comprises a second indication field, configured, by the base station, to carry a trigger notification indicating random access or Early Data Transmission (EDT);
wherein in response to determining that the DCI does not comprise the second indication field, the DCI is configured to trigger a terminal to perform new data transmission or data retransmission on a reserved resource.

2. The method of claim 1, wherein,
in response to the first indication field indicating that the response information is an acknowledgement character (ACK), the DCI carries the second indication field; or
in response to the first indication field indicating that the response information is a non- acknowledgement character (NACK), the DCI carries the second indication field.

3. The method of claim 2, wherein in response to the first indication field indicating that the response information is the ACK, configuring the DCI to trigger a terminal to perform the random access or EDT-based network connection based on the second indication field in response to transmitting new data; or
in response to the first indication field indicating that the response information is the NACK, configuring the DCI to trigger the terminal to perform the random access or the EDT-based network connection based on the trigger notification in response to retransmitting data.

4. The method of claim 1, wherein in response to determining that the DCI comprises the second indication field, determining that the DCI further comprises a third indication field,
wherein the third indication field is configured to indicate a random access type, and the random access type comprises contention-based random access and contention-free random access.

5. The method of claim 4, wherein,
in response to the third indication field indicating that the random access type is the contention-based random access, the DCI is further configured to indicate an initial coverage enhancement level; or
in response to the third indication field indicating that the random access type is the contention-free random access, the DCI is further configured to indicate a preamble index, a physical random access channel mask index, and an initial coverage enhancement level.

6. A method for processing information, comprising:
receiving, by a terminal, Downlink Control Information (DCI);
determining, by the terminal, response information of Hybrid Automatic Repeat Request (HARQ) based on a first indication field contained in the DCI;
in response to determining the DCI comprises a second indication field, determining, by the terminal, a trigger notification indicating random access or Early Data Transmission (EDT) based on the second indication field; and
in response to determining that the DCI does not comprise the second indication field and the first indication field indicates the ACK, performing new data transmission on a reserved resource; or in response to determining that the DCI does not comprise the second indication field and the first indication field indicates the NACK, performing data retransmission on the reserved resource.

7. The method of claim 6, wherein
in response to the first indication field indicating that the response information is an acknowledgement character (ACK), the DCI carries the second indication field; or
in response to the first indication field indicating that the response information is a non- acknowledgement character (NACK), the DCI carries the second indication field.

8. The method of claim 7, further comprising:
in response to the first indication field indicating that the response information is the ACK, performing the random access or EDT-based network connection of new data transmission based on the second indication field; or
in response to the first indication field indicating that the response information is the NACK, performing the random access or EDT-based network connection of data retransmission based on the second indication field.

9. The method of claim 6, wherein in response to determining that the DCI comprises the second indication field, determining that the DCI further comprises a third indication field;
the method further comprises:
determining a random access type based on the third indication field, wherein the random access type comprises contention-based random access and contention-free random access.

10. The method of claim 9, further comprising:
in response to the third indication field indicating that the random access type is the contention-based random access, determining an initial coverage enhancement level based on the DCI; or
in response to the third indication field indicating that the random access type is the contention-free random access, determining a preamble index, a physical random access channel mask index, and an initial coverage enhancement level based on the DCI.

11. A user equipment (UE), comprising:
a memory, and
a processor, wherein when computer-executable instructions stored in the memory are executed by the processor, the processor is configured to:
receive Downlink Control Information (DCI);

determine response information of Hybrid Automatic Repeat Request (HARQ) based on a first indication field contained in the DCI;

determine a trigger notification indicating random access or Early Data Transmission (EDT) based on a second indication field in response to determining that the DCI comprises the second indication field; and in response to determining that the DCI does not comprises the second indication field and the first indication field indicates the ACK, perform new data transmission on a reserved resource;

or in response to determining that the DCI does not comprise the second indication field and the first indication field indicates the NACK, perform data retransmission on the reserved resource.

12. The UE of claim 11, wherein in response to the first indication field indicating that the response information is an acknowledgement character (ACK), the DCI carries the second indication field; or in response to the first indication field indicating that the response information is a non-acknowledgement character (NACK), the DCI carries the second indication field.

13. The UE of claim 12, wherein the processor is further configured to:

in response to the first indication field indicating that the response information is the ACK, perform the random access or EDT-based network connection of new data transmission based on the second indication field; or in response to the first indication field indicating that the response information is the NACK, perform the random access or EDT-based network connection of data retransmission based on the second indication field.

14. The UE of claim 11, wherein the processor is further configured to:

in response to determining that the DCI comprises the second indication field, determine that the DCI further comprises a third indication field; and determine a random access type based on the third indication field, wherein the random access type comprises contention-based random access and contention-free random access.

15. The UE of claim 14, wherein the processor is further configured to:

in response to the third indication field indicating that the random access type is the contention-based random access, determine an initial coverage enhancement level based on the DCI; or in response to the third indication field indicating that the random access type is the contention-free random access, determine a preamble index, a physical random access channel mask index, and an initial coverage enhancement level based on the DCI.

16. A base station, comprising:

a memory, and a processor, wherein when computer-executable instructions stored in the memory are executed by the processor, the processor is configured to perform the method for processing information of claim 1.

* * * * *